Burton A. Jones
INVENTOR.

United States Patent Office 3,229,460
Patented Jan. 18, 1966

3,229,460
TERTIARY INJECTOR FOR PROPULSION
SYSTEM ROLL CONTROL
Burton A. Jones, North Palm Beach, Fla., assignor, by mesne assignments, to the United States of America as represented by the Secretary of the Navy
Filed May 4, 1965, Ser. No. 453,894
4 Claims. (Cl. 60—35.54)

This invention relates to the art of rocket thrust vectoring. More particularly, it relates to a novel apparatus for providing pitch, yaw and roll control for a rocket propelled missile.

Secondary injection thrust vector control systems are well known in the art. The patents to Walker, U.S. 2,916,873 issued December 15, 1959; Wetherbee, U.S. 2,943,821 issued July 5, 1960; and Hooper, U.S. 3,121,312 issued February 18, 1964, may be cited as exemplary. With the exception of Hooper, the prior art secondary injection thrust vector control systems make no provision for roll control, depending for this on separate devices or systems.

In Hooper, roll control is achieved without a separate roll control system by forming a portion, at least, of the main thrust nozzle with an elliptical cross-section. Pitch and yaw injection ports are located on the major and minor axes of the ellipse, and roll control ports are located at the quarter-ellipse positions. Injection of fluid from the quarter-ellipse injection ports produces an unbalanced loading condition on the wall of the nozzle; that is, the summation of forces acting on the wall does not pass through the intersection of the major and minor axes. A roll component is therefore introduced. While the Hooper roll control system is adequate, it is not entirely satisfactory since it is relatively difficult to fabricate the required elliptical cross-section in the thrust nozzle.

Accordingly, it is an object of the present invention to provide a secondary injection thrust control system with an integral roll control system.

It is another object of the invention to add a roll control capability to a secondary injection thrust vector control system in a conventional thrust nozzle of circular cross-section.

It is a further object of the invention to provide such a secondary injection thrust vector and roll control system which is simple in construction and operation.

The objects of the invention are achieved by the provision in an otherwise conventional secondary injection thrust vector control system of a means for deflecting the secondary jet to a position such that it does not pass through the center of thrust or axis of the main nozzle. This is accomplished by what is here termed a tertiary injection system.

Other objects and advantages of the invention will become apparent from a reading of the following detailed description when considered in conjunction with the accompanying drawings wherein.

Figure 1:
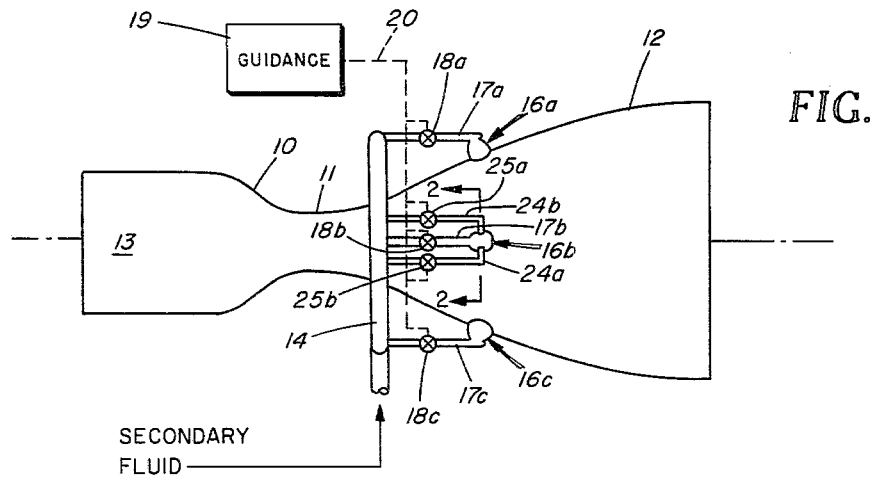
FIG. 1 is a diagrammatic view of a thrust nozzle incorporating the present invention.

Referring now to FIG. 1, the invention is there shown as embodied in a conventional convergent, divergent nozzle. It will be understood, however, that the invention is not limited to such a nozzle but may be employed in other forms of nozzles, such as a plug nozzle, if desired. The nozzle as shown in FIG. 1 comprises a convergent section 10, a throat section 11 and a divergent or expansion portion 12. Hot gases from the combustion chamber 13 will pass through the throat 11 and expand along the walls of the expansion section 12.

For thrust vector control purposes, a secondary injection system is employed consisting of a header 14, annular in form, which surrounds the throat portion 11 of the nozzle. Secondary fluid from a source not shown is supplied under pressure to header 14. Extending from header 14 to a plurality of secondary injection nozzles 16a, 16b, 16c and another nozzle not shown, are a series of conduits 17a to 17c provided with valves 18a to 18c. Valves 18a to 18c are controlled between their open and closed positions by signals from a guidance system 19 transmitted over a control line 20. Valves 18a to 18c may be solenoid operated, for example, and control line 20 may be a set of electrical leads for carrying electrical signals from guidance system 19 to the valves. It will be understood that the other nozzle, which is located at the far side of the thrust nozzle as seen in FIG. 1, is also provided with a valved supply conduit.

As thus far described, the invention is a conventional secondary injection thrust vector control system capable of providing pitch and yaw steering. In order to provide roll control, at least one of the secondary injection nozzles is modified in the following manner. As suggested in FIG. 2, for example, the roll control nozzle is nozzle 16b. This nozzle is provided with a throat portion 21 and a diverging portion 22 arranged to constitute a fully expanded nozzle with respect to the pressure prevailing in the conduit 17 and in the main thrust nozzle at the location of nozzle 16b. At each side of nozzle 16b, in the plane of the section of FIG. 2, which coincides with the plane normal to the thrust axis to which the secondary injection nozzles are parallel, are a pair of tertiary injection ports 23a and 23b. Fluid is supplied to these injection ports from the header 14 through conduits 24a and 24b. Valves 25a and 25b are responsive to signals from the guidance system 19 to control the flow of fluid to the ports 23a and 23b.

Figure 2:
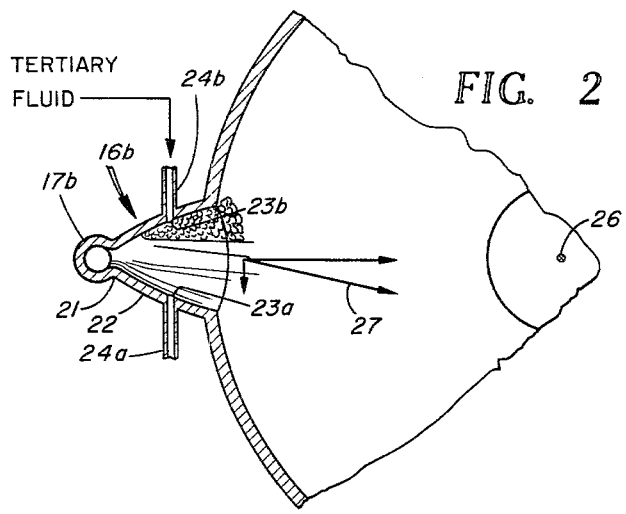
FIG. 2 is a partial transverse cross-section through the main thrust nozzle taken on line 2—2 of FIG. 1.

In operation, when the device is operated as a standard secondary injection system, the jet from the nozzle 16 of FIG. 2 is effectively directed through the center of thrust 26 of the main nozzle which is, of course, coincident with its axis. When it is desired to effect a rolling maneuver of the rocket, one of the valves 25a or 25b is actuated to supply tertiary fluid to the corresponding tertiary injection port. As illustrated in FIG. 2, this port is the port 23b, for example. Upon injection of tertiary fluid from injection port 23b, the effective jet vector of nozzle 16b would be deflected to the left as illustrated by the vector 27 in FIG. 2. It will be noted that the jet vector then no longer passes through the center of thrust 26 of the main thrust nozzle. A rolling moment is therefore produced about the center of thrust. Of course, when it is desired to stop the rolling motion, the valve 25b would be turned off, and if necessary, the opposite valve would be opened to provide a braking force.

Figure 3:
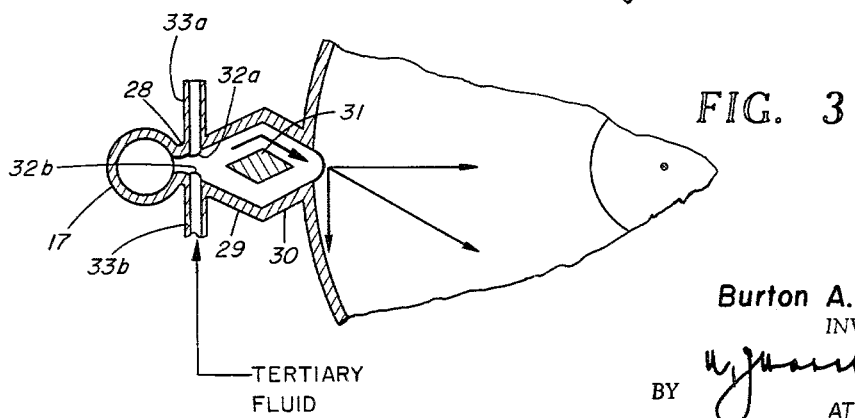
FIG. 3 is a partial section showing a second form of secondary injection nozzle according to the invention.

The tertiary injection concept is not limited to a fully expanded nozzle of the type shown in FIG. 2, but may also be employed with a monostable valve structure as illustrated in FIG. 3. In the embodiment of FIG. 3, the secondary injection nozzle is essentially the same kind of nozzle as is described in the patent to Hausmann, U.S. 3,143,856 issued August 11, 1964. Fluid is supplied to this valve from the conduit 17 through a throat portion 28. The fluid then expands into a diverging portion 29 and then travels on into a converging portion 30. A center body 31 is supported symmetrically within the valve in any suitable manner. Near the throat portion 28, the valve is provided with opposed control ports 32a and 32b which receive fluid from tertiary injection conduits 33a and 33b, respectively.

In the operation of the embodiment of FIG. 3, flow from conduit 17 and the throat 28 normally splits uniformly around the center body and is ejected into the main thrust nozzle with an effective direction through the center of thrust. Upon introduction of control fluid through one of the tertiary control ports, 32a for example, the secondary flow is diverted to the opposite side of the center body 31. The effective direction of the secondary injection jet is not, therefore, through the axis of the thrust nozzle or center of thrust, and a roll moment results. Pressure variations in the main nozzle do not effect the switching characteristics of this embodiment, because of the crossing and blocking relationship of the two outflow passages. This effect is more fully explained in the Hausmann patent, referred to above, and in the patent to Kepler et al., U.S. 3,135,291, issued June 2, 1964.

It will be understood by those skilled in the art that, since the present roll control system operates internally of the thrust nozzle in conjunction with the secondary injection system, actuation of the roll control will necessarily produce a pitch or yaw movement as well as roll. Accordingly, operation of the roll control must be compensated for, as by introducing an opposite pitch or yaw injection at the side of the main nozzle opposite the nozzle 16b. Such compensation is readily available by suitable programming of the control signals from the guidance system 19.

Obviously many variations and modifications of the invention will occur to those skilled in the art after reading the above disclosure. It is therefore to be understood that within the scope of the appended claims the invention may be practiced otherwise than as specifically described.

What is claimed is:

1. In a propulsion system having a thrust nozzle having an axis, a secondary injection thrust vector control system consisting of a plurality of secondary injection nozzles spaced about the periphery of said thrust nozzle and arranged generally parallel to a plane normal to said axis, and means for selectively supplying fluid to said secondary injection nozzles for producing control jets in directions normally intersecting said axis, the improvement comprising means associated with at least one of said secondary injection nozzles for deflecting the jet issuing therefrom into a direction in said plane which does not intersect said axis, whereby a rolling moment about said axis is produced.

2. A thrust vector and roll control system for a propulsion system having a thrust nozzle having an axis comprising a plurality of secondary injection nozzles spaced about the periphery of said thrust nozzle generally parallel to a plane normal to the axis thereof, means for selectively supplying fluid under pressure to said secondary injection nozzles to produce jets of control fluid in directions normally intersecting said axis, and means associated with at least one of said secondary injection nozzles for deflecting the jet issuing therefrom into a direction in said plane which does not intersect said axis, whereby a rolling moment about said axis is produced.

3. A propulsion system as recited in claim 2 wherein said one secondary injection nozzle is a converging-diverging nozzle, the divergent portion of which is fully expanded with respect to the pressure normally present in the vicinity of said plane when said thrust nozzle is in operation, a pair of tertiary injection ports in diametrically opposite sides of said divergent portion, the centers of said tertiary injecton ports lying in said plane, and means for selectively supplying fluid under pressure to one or the other of said tertiary injection ports for varying the direction of the jet issuing from said converging-diverging nozzle.

4. A propulsion system as defined in claim 2 wherein said one injection nozzle is a monostable valve having an inlet portion and means defining a pair of branch passageways, the axes of which diverge away from said inlet portion for a predetermined distance and then converge toward each other to terminate in a pair of secondary injection ports disposed at a substantial angle to each other, a pair of control ports diametrically opposed across said inlet portion and lying in said plane, and means for selectively supplying fluid under pressure to one or the other of said control ports to deflect fluid into one or the other of said branch passageways.

References Cited by the Examiner

UNITED STATES PATENTS

| 3,016,063 | 1/1962 | Hausmann | 137—81.5 |
| 3,121,312 | 2/1964 | Hopper | 60—35.54 |
| 3,122,165 | 2/1964 | Horton. | |
| 3,135,225 | 5/1964 | Pennington | 60—35.54 |
| 3,143,856 | 8/1964 | Haussmann | 60—35.54 |
| 3,166,897 | 1/1965 | Lawrence et al. | 60—35.54 |
| 3,204,405 | 9/1965 | Warren et al. | 60—35.54 |
| 3,206,928 | 9/1965 | Moore | 60—35.54 |

FOREIGN PATENTS 748,983   6/1956   Great Britain.

MARK NEWMAN, *Primary Examiner.*

A. L. SMITH, *Assistant Examiner.*